United States Patent [19]

White, Jr.

[11] 4,027,545
[45] June 7, 1977

[54] ENDLESS POWER TRANSMISSION BELT AND METHOD OF MAKING SAME

[75] Inventor: Jack D. White, Jr., Springfield, Mo.

[73] Assignee: Dayco Corporation, Dayton, Ohio

[22] Filed: Mar. 19, 1976

[21] Appl. No.: 668,544

[52] U.S. Cl. .............................. 74/233; 156/138; 156/140
[51] Int. Cl.² .................. F16G 5/16; F16G 1/00; B29H 7/22
[58] Field of Search .......... 74/233 E, 234; 156/138, 156/139, 140

[56] References Cited
UNITED STATES PATENTS

| 3,657,938 | 4/1972 | Fisher | 74/233 |
| 3,981,206 | 9/1976 | Miranti, Jr., et al. | 74/233 |

*Primary Examiner*—Leonard H. Gerin
*Attorney, Agent, or Firm*—Reuben Wolk

[57] ABSTRACT

An endless power transmission belt and method of making the same are provided wherein the belt comprises a tension section, a compression section, and a load-carrying section with the load-carrying section being a flat strip of rubber bonded between the tension and compression sections and having a plurality of elongated discrete fibers embedded therein.

12 Claims, 4 Drawing Figures

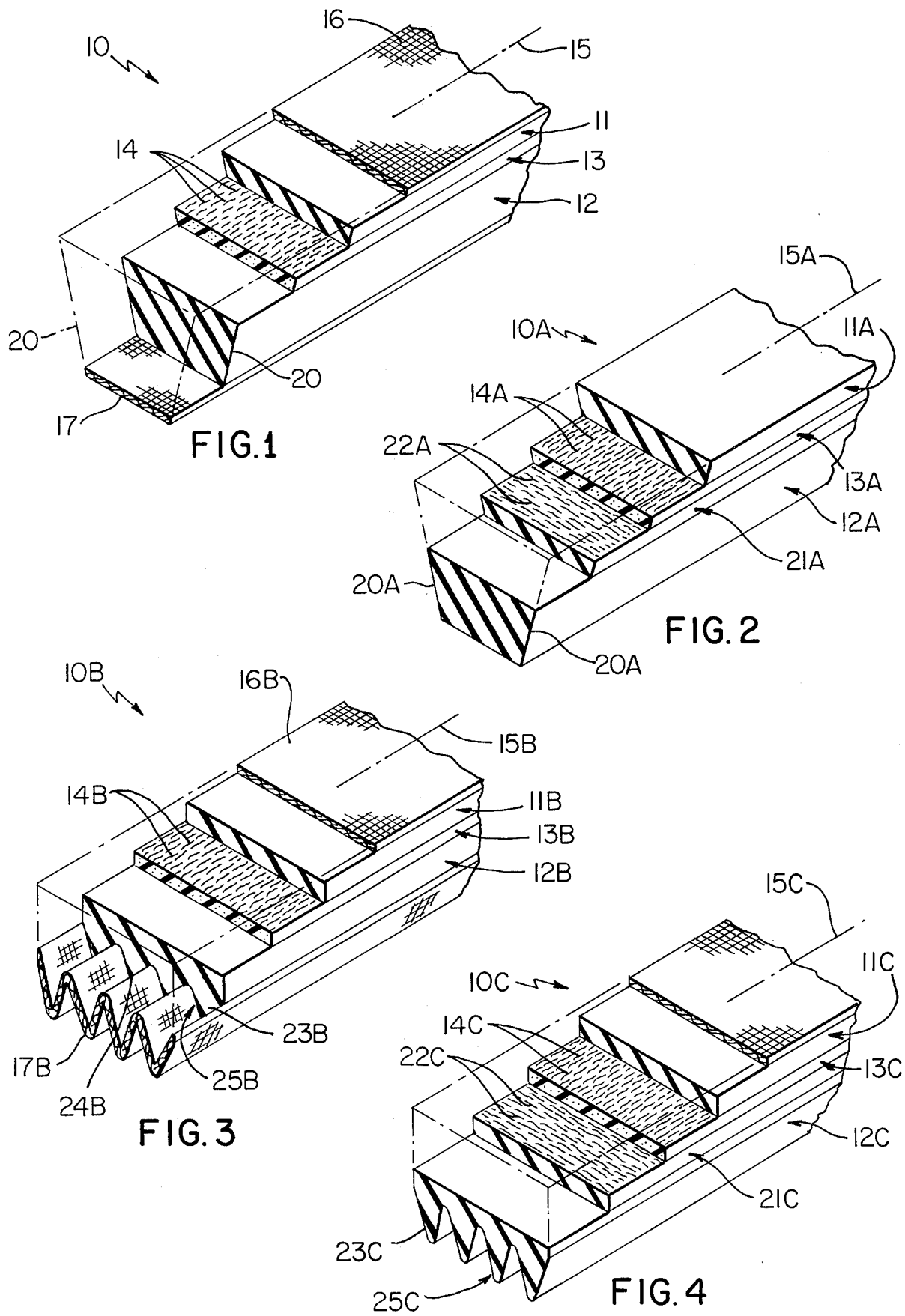

ENDLESS POWER TRANSMISSION BELT AND METHOD OF MAKING SAME

BACKGROUND OF THE INVENTION

Endless power transmission belts are in wide use throughout industry and there is a continuing effort to produce such belts economically without compromising the performance and service life thereof. In particular, considerable attention has been given to making a load-carrying section for each of these belts using comparatively inexpensive materials and as shown in U.S. Pat. No. 3,657,938, for example. However, as shown by this patent efforts to use inexpensive materials often require the use of special equipment and associated methods which often increase the cost of a belt made using same.

SUMMARY

It is a feature of this invention to provide a simple and economical endless power transmission belt which may be made without requiring special equipment or processing.

Another feature of this invention is to provide an endless power transmission belt having a load-carrying section which is of optimum economy yet provides satisfactory performance over an extended service life.

Another feature of this invention is to provide an endless power transmission belt comprising a tension section, a compression section, and a load-carrying section with the load-carrying section being a flat strip of rubber which is bonded between the tension and compression sections and the rubber of such strip serves as an elastomeric matrix which has a plurality of elongated discrete strength fibers embedded therein.

Other feature of this invention is to provide a method of making an endless power transmission belt of the character mentioned.

Accordingly, it is an object of this invention to provide an endless power transmission belt and method of making the same having one or more of the novel features set forth above or hereinafter shown or described.

Another details, features, objects, uses, and advantages of this invention will become apparent from the embodiments thereof presented in the following specification, claims, and drawings.

BRIEF DESCRIPTION OF THE DRAWINGS

The accompanying drawings show present preferred embodiments of this invention, in which FIG. 1 is a perspective view with parts in cross-section, parts in elevation, and parts broken away illustrating one exemplary embodiment of an endless power transmission belt of this invention;

FIG. 2 is a view similar to FIG. 1 illustrating another exemplary embodiment of the belt of this invention;

FIG. 3 is a view similar to FIG. 1 illustrating another exemplary embodiment of the belt of this invention which has a plurality of longitudinally extending ribs defining a portion of its compression section; and FIG. 4 is a view similar to FIG. 3 illustrating another exemplary embodiment of the belt of this invention.

DESCRIPTION OF ILLUSTRATED EMBODIMENTS

Reference is now made to FIG. 1 of the drawing which illustrates one exemplary embodiment of an endless power transmission belt of this invention which is designated generally by the reference numeral 10 and which is particularly adapted for operation around associated sheaves in an endless path and as is well known in the art. The belt 10 comprises a tension section 11, a compression section 12, and a load-carrying section 13 with the load-carrying section being a flat strip of rubber bonded between the tension and compression sections 11 and 12 respectively.

The load-carrying section 13 has a plurality of elongated discrete particles or fibers 14 embedded therein in a random manner preferably with the elongated dimension of each of such fibers disposed substatially parallel to the endless path of the belt which may be considered the longitudinal axis of the belt with such axis and endless path being designated by the reference numeral 15. The particles or fibers 14 are comparatively high strength members, primarily in tension, and serve to increase the strength of the rubber load-carrying section 13; and, the rubber of such load-carrying section serves as a matrix in which the fibers 14 are embedded.

The belt 10 has covers 16 and 17 on the tension and compression sections 11 and 12 respectively; and, although each cover 16 and 17 may be made of any suitable material each cover of this example is a square-woven fabric cover. It will also be seen that the belt 10 is of substantially trapezoidal cross-sectional configuration wherein the parallel sides of the trapezoid are defined by the covers 16 and 17 and the non-parallel sides of the trapezoid are free of covers or so-called raw-edged sides each designated by the same reference numeral 20.

Other exemplary embodiments of the belt of this invention are illustrated in FIGS. 2, 3, and 4 of the drawing. The belts illustrated in FIGS. 2, 3, and 4 are very similar to the belt 10; therefore, such belts will be designated generally by the reference numeral 10A, 10B, and 10C respectively and parts of such belts 10A, 10B, and 10C which are very similar to corresponding parts of the belt 10 will be designated by the same reference numeral as in the belt 10 also followed by the associated letter designation A, B, or C and not described again in detail. Only those component parts of each of the belts 10A, 10B, and 10C which are different from corresponding parts of the belt 10 will be designated by a new reference numeral also followed by its associated letter designation and described in detail.

The belt 10A has a tension section 11A, a compression section 12A, and a load-carrying section 13A; however, it will be seen that the belt 10A does not have an outside cover or an inside cover whereby its tension section 11A and compression section 12A in each instance is free of an outermost cover. Accordingly, the outside and inside surfaces of the belt 10A are raw-edged in a similar manner as opposed sides 20A thereof.

In addition to being free of outside and inside covers, the belt 10A has a compression section 12A which includes a fiber-loaded platform layer 21A. The fiber-loaded platform layer 21A is comprised of a plurality of elongated fibers 22A similar to the fibers 14A in the load-carrying section 13A and the fibers 22A are disposed in a random manner and with their elongated dimensions substantially transverse the endless path or longitudinal axis 15A of the belt 10A. The fibers 22A serve to provide transverse rigidity for the belt 10A.

The belt 10B of FIG. 3 has a tension section 11B, a compression section 12B, and a load-carrying section 13B. However, it will be seen that the compression section 12B includes a plurality of four (in this exemplary embodiment) longitudinally extending integral belt elements or projections which will be referred to hereinafter as longitudinal ribs 23B. Each rib 23B has a sharp apex or crest 24B whereby each rib may be considered substantially V-shaped and the V-shaped ribs 23B define what may be considered a substantially saw-toothed surface which is designated generally by the reference numeral 25B.

The belt 10B also has an outside cover 16B and an inside cover 17B on the saw-toothed shaped surface 25B and the cover 17B defines the inside surface of the belt 10B. In addition, the load-carrying section 13B of the belt 10B is in the form of a rubber strip which has elongated particles or fibers 14B embedded therein and the fibers 14B extend substantially parallel to the endless path or longitudinal axis 15B of such belt.

The belt 10C of FIG. 4 has a tension section 11C, a compression section 12C, and a load-carrying section 13C and it will be seen that the compression section 12C has a plurality of longitudinally extending V-shaped ribs 23C which in this example are free of a cover and define a raw-edged saw-toothed surface which is the inside surface of the belt 10C. The belt 10C also comprises a compression section 12C which includes a platform layer 21C and the platform layer 21C is also comprised of rubber matrix material having a plurality of elongated particles or fibers 22C embedded therein in a similar manner as the fibers 22A of the layer 21A of belt 10A. The elongated fibers 22C preferably extend transverse (also perpendicular in this example) the endless path or longitudinal axis 15C of the belt 10C.

Each of the belt 10, 10A, 10B, and 10C may be made utilizing commercially available equipment or apparatus. In particular, each of these belts is preferably made by wrapping a first uncured rubber layer around a conventional cylindrical belt sleeve defining drum, wrapping a layer of uncured fiber-loaded rubber against the first layer, wrapping a second uncured rubber layer against the fiber-loaded layer with the layers cooperating to define a belt-defining sleeve. The language "belt-defining sleeve" is used in the known terminology of the art to refer to the fact that a sleeve is formed which is used to define a plurality of belts as will now be further explained.

The belt-defining sleeve thus defined is at this point uncured and such sleeve is cured or vulcanized, and later cooled, by subjecting the belt-defining sleeve to a controlled temperature and pressure environment in accordance with techniques which are well know in the art. In particular, the curing or vulcanizing may be achieved using steam under pressure to control the temperature and pressure of a receiving chamber within which the drum and sleeve are disposed. Steam at a predetermined temperature and pressure is also introduced within and removed from the drum as is also known in the art. This steam heating within the drum and around the sleeve is achieved for a predetermined time increment to provide the required degree of vulcanization or cure.

The drum and now cured sleeve are suitably cooled utilizing cold tap water, or other suitable cooling medium; and, once such belt-defining sleeve is cooled it is cut to define a plurality of individual belts either 10, 10A, 10B, or 10C. The cutting may be achieved in accordance with techniques which are known in the art and in the case of belts 10 and 10A the drum may serve as a mandrel supporting the belt sleeve during cutting thereof. In the case of belts 10B and 10C the cutting may be achieved after removal of the belt sleeve from is supporting drum.

It will be appreciated that the belts 10B and 10C may be made utilizing collapsible built-up drums which have special circumferential alternating rib-defining grooves and projections therein. Further, in building up a belt sleeve used to define belts 10B the built-up procedure is such that a fabric layer is placed on the alternating grooves and projections followed by the other layers defining the various belt sections in the usual manner. The cutting step would be achieved by turning the sleeve of this type inside out and placing such a sleeve on a smooth mandrel for cutting.

The load-carrying sections 13, 13A, 13B, and 13C are provided with their associated discrete fibers or particles 14, 14A, 14B, and 14C respectively and these fibers may be made of any suitable material known in the art and may be of the order of a few thousandths of an inch in diameter such as 0.001 to 0.005, for example, and such fibers may range in length from a few thousandths of an inch, for example. It will also be appreciated that these fibers may be made of any suitable material known in the art including natural fibers and synthetic fibers as well as both metallic and non-metallic materials.

Although the covers shown on the belts 10, 10B, and 10C are shown as woven fabric covers, and suitable type of cover may be provided. Further, the sides of the belt of this invention need not necessarily be raw-edged whereby the entire belt may be wrapped in accordance with techniques known in the art.

It will also be appreciated that the fibers in each load-carrying section of a particular belt need not necessarily be disposed parallel to the endless path of the belt but may be disposed at any desired angle relative to such endless path. Similarly, the platform layers 21A, and 21C of the belts 10A and 10C may have their fibers disposed transverse the associated endless path at other angles.

It will also be appreciated that the fiber-loaded load-carrying section of each of the belts may be made of any suitable rubber of syntheitc rubber known in the art.

While present exemplary embodiments of this invention, and methods of practicing the same, have been illustrated and described, it will be recognized that this invention may be otherwise variously embodied and practiced wihin the scope of the following claims.

What is claimed is:

1. An endless power transmission belt for operation in an endless path comprising, a tension section, a compression section, and a load-carrying section, said load-carrying section being a flat strip of rubber bonded between said tension and compression sections and having a plurality of elongated discrete fibers embedded therein, said compression section comprising a fiber-loaded platform layer providing transverse rigidity for said belt.

2. A belt as set forth in claim 1 in which said fibers in said flat strip of rubber of said load-carrying section are randomly disposed and with their elongated dimensions substantially parallel to said endless path.

3. A belt as set forth in claim 1 and further comprising a cover on each of said tension and compression section.

4. A belt as set forth in claim 3 which each of said covers is a woven fabric cover.

5. A belt as set forth in claim 1 in which said fiber-loaded platform layer has a plurality of elongated discrete fibers embedded therein in a random manner and with their elongated dimensions substantially transverse said endless path.

6. A belt as set forth in claim 1 in which said compression section has a plurality of spaced ribs defined as an integral part thereof and extending along said endless path.

7. A belt as set forth in claim 6 in which said ribs are substantially V-shaped ribs defining a saw-toothed shaped surface.

8. A belt as set forth in claim 7 and further comprising a fabric cover on said tension section defining the outside surface of said belt and fabric cover on said saw-toothed shaped surface defining the inside surface of said belt.

9. A method of making endless power transmission belts each for operation in an endless path comprising the steps of, wrapping a first uncured rubber layer around a cylindrical drum, wrapping a layer of uncured fiber-loaded rubber against said first layer, wrapping a second uncured rubber layer against said fiber-loaded layer, said layers defining a tubular belt-defining sleeve, curing and cooling said sleeve, and cutting said sleeve after curing and cooling thereof to define a plurality of said belts each having a load-carrying section defined by a portion of said fiber-loaded layer and having a tension and compression section defined by a portion of an associated one of said rubber layers.

10. A method as set forth in claim 9 and comprising the further steps of wrapping a cover layer against said drum prior to wrapping said first layer therearound, and wrapping another cover layer against said second uncured rubber layer with portions of said cover layer defining inside and outside covers of associated belts after said cutting step.

11. A method as set forth in claim 9 in which said step of wrapping a layer of uncured fiber-loaded rubber comprises wrapping a sheet of rubber in a plurality of turns around said first layer to define said layer of uncured fiber-loaded rubber, said sheet having elongated fibers embedded therein substantially parallel relation and said sheet is wrapped with its elongated fibers extending with their elongated dimensions circumferentially around said drum so that upon cutting said belt sleeve the fibers are disposed parallel to the endless path of an associated belt.

12. A method as set forth in claim 9 in which said step of wrapping said sheet comprises wrapping said sheet having elongated fibers of not more than an inch in length embedded therein.

* * * * *